US008408038B2

(12) United States Patent
Young

(10) Patent No.: US 8,408,038 B2
(45) Date of Patent: Apr. 2, 2013

(54) SHUTTER-TYPE CRIMPER

(76) Inventor: Thomas M. Young, Point Richmond, CA (US)

( * ) Notice: Subject to any disclaimer, the term of this patent is extended or adjusted under 35 U.S.C. 154(b) by 900 days.

(21) Appl. No.: 12/302,368

(22) PCT Filed: May 25, 2007

(86) PCT No.: PCT/US2007/012465
§ 371 (c)(1),
(2), (4) Date: Jul. 1, 2009

(87) PCT Pub. No.: WO2007/139922
PCT Pub. Date: Dec. 6, 2007

(65) Prior Publication Data
US 2009/0308129 A1 Dec. 17, 2009

(51) Int. Cl.
*B23P 21/00* (2006.01)
*B21D 41/04* (2006.01)
(52) U.S. Cl. .......................................... 72/402; 29/283.5
(58) Field of Classification Search .................... 72/402, 72/409.12, 482.1, 482.92; 29/282, 283.5, 29/508, 516, 722
See application file for complete search history.

(56) References Cited

U.S. PATENT DOCUMENTS

| | | | | |
|---|---|---|---|---|
| 1,319,837 | A | 10/1919 | Brinkman | |
| 2,409,549 | A | 10/1946 | Djdics | |
| 3,085,313 | A | 4/1963 | Macy | |
| 3,378,282 | A | 4/1968 | Demler, Sr. | |
| 3,478,565 | A | 11/1969 | Schenk et al. | |
| 3,695,087 | A | 10/1972 | Tuberman | |
| 3,771,343 | A | 11/1973 | Dawson | |
| 3,924,440 | A | 12/1975 | Vinje | |
| 4,308,744 | A | 1/1982 | Baker | |
| 4,350,036 | A | 9/1982 | Valente | |
| 4,454,657 | A | 6/1984 | Yasumi | |
| 4,796,456 | A | 1/1989 | Schmoll et al. | |
| 4,879,893 | A | 11/1989 | Duri' | |
| 4,930,326 | A | 6/1990 | Rottinghaus | |
| 5,816,094 | A | 10/1998 | Birks | |
| 6,016,682 | A | 1/2000 | Tannhauser et al. | |
| 6,176,116 | B1 | 1/2001 | Wilhelm et al. | |
| 6,360,577 | B2 | 3/2002 | Austin | |
| 6,421,905 | B1 | 7/2002 | Feher | |
| 6,484,553 | B1 | 11/2002 | Devers | |
| 6,823,576 | B2 | 11/2004 | Austin | |
| 6,823,583 | B2 | 11/2004 | Cirio | |
| 6,840,081 | B2 | 1/2005 | Kokish | |
| 6,915,560 | B2 | 7/2005 | Austin | |
| 7,021,114 | B2 | 4/2006 | Perreault | |
| 7,143,625 | B2 * | 12/2006 | Edin | 72/402 |
| 7,240,466 | B2 | 7/2007 | Vermee et al. | |

(Continued)

*Primary Examiner* — David B Jones
(74) *Attorney, Agent, or Firm* — Porter, Wright, Morris & Arthur LLP

(57) ABSTRACT

A crimping device is provided for crimping an outer work piece onto an inner work piece. The crimping device includes at least two jaws forming a throat surface about the outer work piece and movable between a partially closed position wherein the outer work piece is not crimped and a closed position wherein the jaws crimp the outer work piece onto the inner work piece. The jaws are configured as a shutter mechanism so that the throat surface remains substantially continuous about the first work piece as the jaws move from the partially closed position to the closed position. At least one of the jaws moves in straight line motion as the jaws move from the partially closed position to the closed position. At least two of the jaws radially and slide against each other as the jaws move from the partially closed position to the closed position.

37 Claims, 16 Drawing Sheets

U.S. PATENT DOCUMENTS

| | | | | |
|---|---|---|---|---|
| 7,628,051 | B1 * | 12/2009 | Kokish et al. | 72/402 |
| 7,895,876 | B2 * | 3/2011 | Spenser et al. | 72/402 |
| 7,963,142 | B2 * | 6/2011 | Goff | 72/402 |
| 2005/0188525 | A1 | 9/2005 | Weber et al. | |
| 2005/0234537 | A1 | 10/2005 | Edin | |
| 2007/0271990 | A1 | 11/2007 | Young | |

* cited by examiner

SHUTTER-TYPE CRIMPER

CROSS-REFERENCE TO RELATED APPLICATIONS

Not Applicable.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a crimping or swaging device and, more specifically, to a crimping or swaging device for producing uniform crimps, reductions in circumference, or deformations in a continuous manner such that no ridges or bends are created.

BACKGROUND OF THE INVENTION

Conventional systems used to crimp or swage work pieces together create ridges, bends and/or non-uniformities. These crimping or swaging devices typically use multiple fingers or jaws that are moved inward towards a common central longitudinal axis in a straight, non-overlapping motion. These jaws commonly have spaces between them that create the ridges, bends, and/or non-uniformities which can be problematic. For example, when the crimping devices are used to clamp air or hydraulic hoses onto fittings, such as hose barbs, the ridges, bends, and/or non-uniformities can become leakage paths for the fluids carried in the hoses.

FIG. 1 illustrates a U-type die typical of a two-part crimper device 10 using so-called "straight, non-overlapping motion". The two jaws 12 are disposed in relation to each other and are brought together to produce a round (or other shape) crimp when fully closed. It is only in the final position when the jaws 12 are fully brought together that the spaces or gaps 14 are closed and the throat or crimping surface 16 becomes continuous. These non-uniformities in the crimping surface result in non-uniform flow of the swaged material. FIG. 2 illustrates a ferrule 18 that was crimped with such a crimping device 10 and demonstrates the non-uniform "ears" 20 that are formed which can become leakage paths if such a ferule 18 joins a hose to a fitting.

In an attempt to reduce or eliminate these non-uniformities, crimping tool manufacturers have produced systems with a larger number of jaws. FIG. 3 illustrates such a crimping device 22 having six jaws 23 with gaps or spaces 24 therebetween. The jaws 23 are radially moved inward towards a central longitudinal axis to affect a crimp. Although the larger number of jaws 23 produces a more uniform result, FIG. 4 illustrates that a ferrule 25 crimped by this device 22 still demonstrates non-uniformities 26 which can become leakage paths 28 between the hose 30 and the fitting 32. It is noted that it is not possible to produce a fully round, uniform crimp with straight, non-overlapping motion because the spaces 24 between the jaws 23 do not fully constrain the ferrule 25. Similar problems are also created when the crimping devices are used to join other items such as, for example, electrical connectors, stanchions, and the like.

In another attempt to reduce or eliminate these non-uniformities, crimping tool manufacturers have produced systems with a jaws travel along an arc. FIG. 5 illustrates such a crimping device 34 having four jaws 36 having a pivot mechanism such that the jaws 36 each travel along an arc to open and close the throat. The jaws 36 moving along an arc, however, do not remain in contact with each other and thus still can result in nonuniformities. In fact, such crimping devices 34 do not achieve continuous flow because the crimping devices 34 simply smash four arcs of the cylindrical ferrule flat. They do not uniformly reduce the overall perimeter of the ferrule. Such crimping devices 34 also cannot produce round crimps and cannot crimp bulky fittings onto continuous work pieces because the devices are incapable of side entry and exit. Accordingly, there is a need in the art for an improved method and device for crimping or swaging an outer work piece onto an inner work piece.

SUMMARY OF THE INVENTION

The present invention provides a crimping or swaging device which overcomes at least some of the above-noted problems of the related art. According to the present invention, a crimping device for crimping a first work piece onto a second work piece located internal to said first work piece includes, in combination, at least two jaws forming a throat surface about the first work piece. The jaws are movable between a partially closed position wherein the first work piece is not crimped onto the second work piece and a closed position wherein the jaws engage and crimp the first work piece onto the second work piece to form a fluid-tight seal. The throat surface is substantially continuous about the first work piece as the jaws move from the partially closed position to the closed position. At least one of the jaws moves in straight line motion as the jaws move from the partially closed position to the closed position.

According to another aspect of the present invention, a crimping device for crimping a work piece includes, in combination, at least two jaws forming a throat surface about the first work piece. The jaws are movable between a partially closed position wherein the work piece is not crimped and a closed position wherein the jaws engage and crimp the work piece. The throat surface is substantially continuous about the work piece as the jaws move from the partially closed position to the closed position. At least two of the jaws overlap in a longitudinal direction of the throat surface and slide against each other as the jaws move from the partially closed position to the closed position.

According to yet another aspect of the present invention, a crimping device for crimping a work piece includes, in combination, at least two jaws forming a throat surface about the work piece. The jaws are movable between a partially closed position wherein the work piece is not crimped and a closed position wherein the jaws engage and crimp the work piece. The throat surface is substantially continuous about the work piece as the jaws move from the partially closed position to the closed position. At least two of the jaws separate for entry of the work piece in a radial direction between the separated jaws.

According to yet another aspect of the present invention, a method for crimping a first work piece onto a second work piece located internal to said first work piece includes steps of, in combination, providing at least two jaws forming a throat surface about the first work piece and moving the jaws from a partially closed position wherein the first work piece is not crimped onto the second work piece to a closed position wherein the jaws engage and crimp the first work piece onto the second work piece to form a fluid-tight seal. At least one of the jaws moves with straight-line motion. The throat surface is maintained substantially continuous about the first work piece as the jaws move from the partially closed position to the closed position.

According to yet another aspect of the present invention, a crimping device for crimping a first work piece onto a second work piece located internal to said first work piece, said crimping device includes, in combination, at least two jaws forming a throat surface about the first work piece and movable between a partially closed position wherein the first work piece is not crimped onto the second work piece and a closed position wherein the jaws engage and crimp the first work piece onto the second work piece to form a fluid-tight seal. Each of the jaws is in continuous sliding area contact with adjacent ones of the jaws as the jaws move from the partially closed position to the closed position. The throat surface is substantially continuous about the first work piece as the jaws move from the partially closed position to the closed position.

According to yet another aspect of the present invention, a crimping device includes, in combination, at least two jaws forming a throat surface about a work piece and movable between a partially closed position and a closed position wherein the jaws reduce a perimeter of the work piece along a contact path of the throat surface. The throat surface is substantially continuous about the work piece as the jaws move from the partially closed position to the closed position. Each of the jaws is in continuous sliding area contact with adjacent ones of the jaws as the jaws move from the partially closed position to the closed position. Each of the jaws rotate relative to at least one other of the jaws with the rotation in a plane normal to a central axis of said throat surface.

From the foregoing disclosure and the following more detailed description of various preferred embodiments it will be apparent to those skilled in the art that the present invention provides a significant advance in the technology and art of crimping or swaging devices. Particularly significant in this regard is the potential the invention affords for providing a high quality, feature-rich crimping or swaging device that can produce a fully round, uniform crimps reductions in circumference, or deformations. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein.

Figure 1:
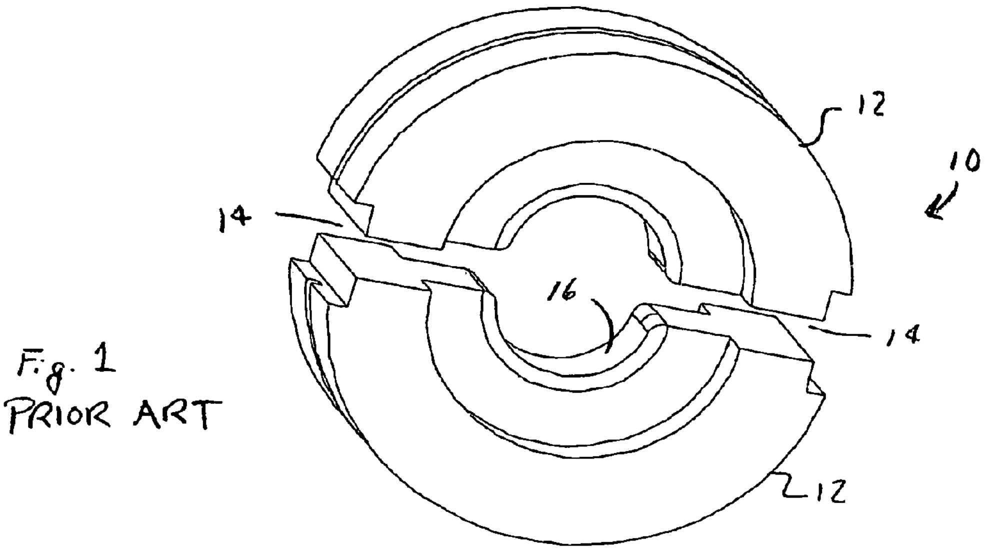
Fig. 1 PRIOR ART
FIG. 1 is a perspective view of a U-shaped die of a prior art crimping device.
Figure 2:
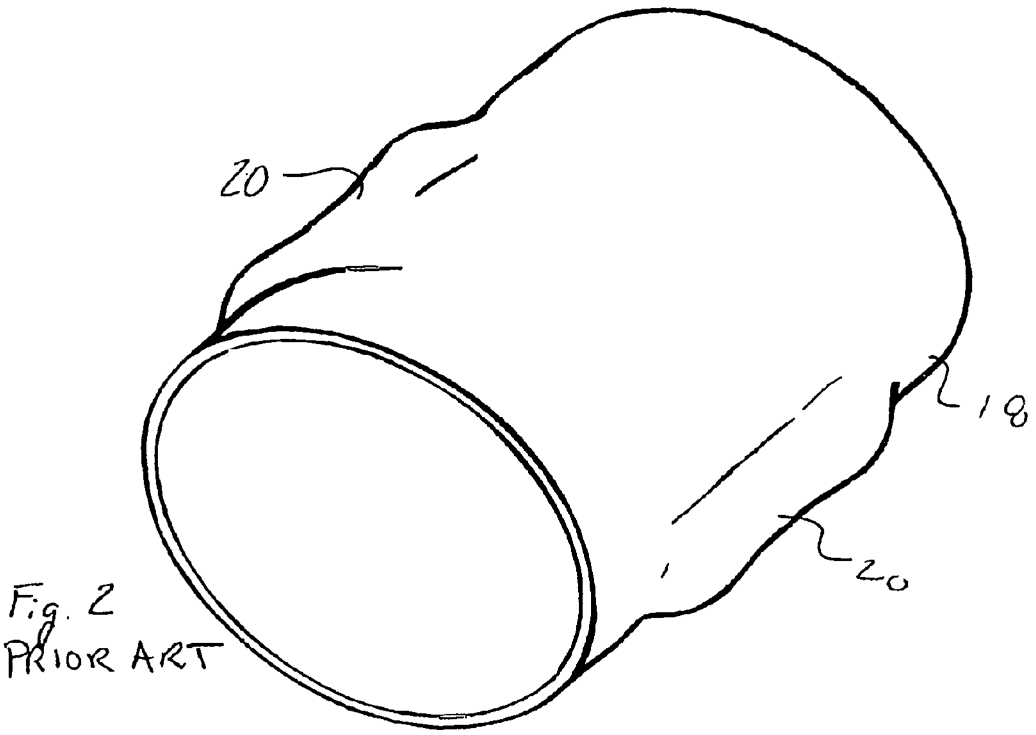
Fig. 2 PRIOR ART
FIG. 2 is a perspective view of a crimped ferrule having ears formed by the U-shaped die of FIG. 1.
Figure 3:
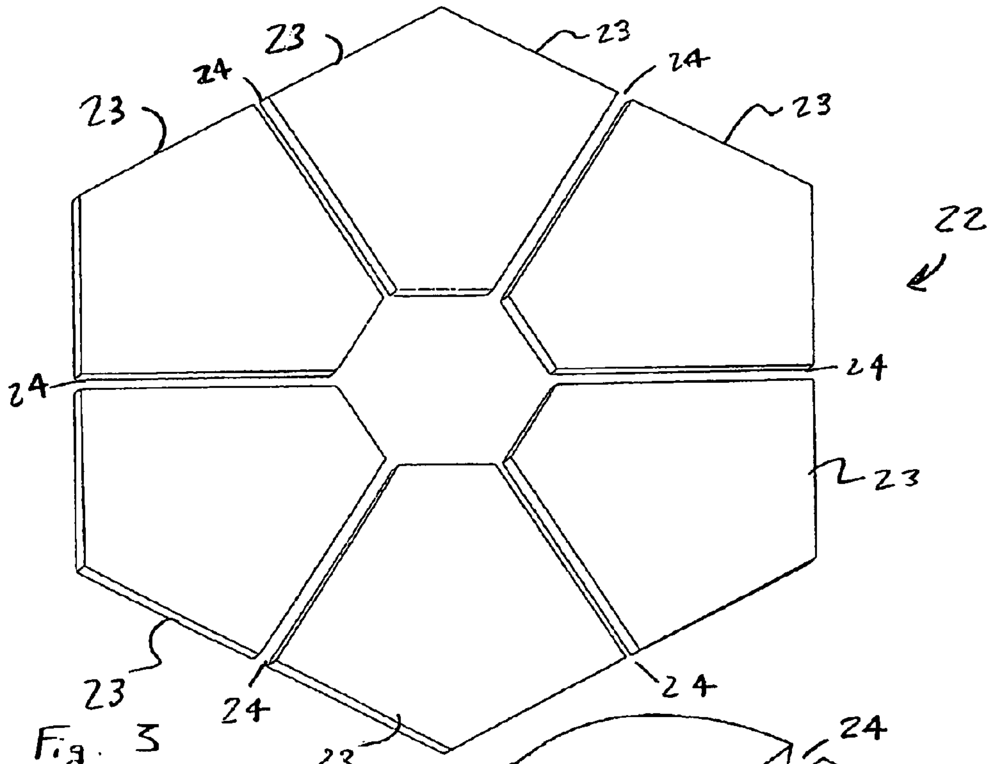
Fig. 3 PRIOR ART
FIG. 3 is a perspective view of a six-jaw die of a prior art crimping device.
Figure 4:
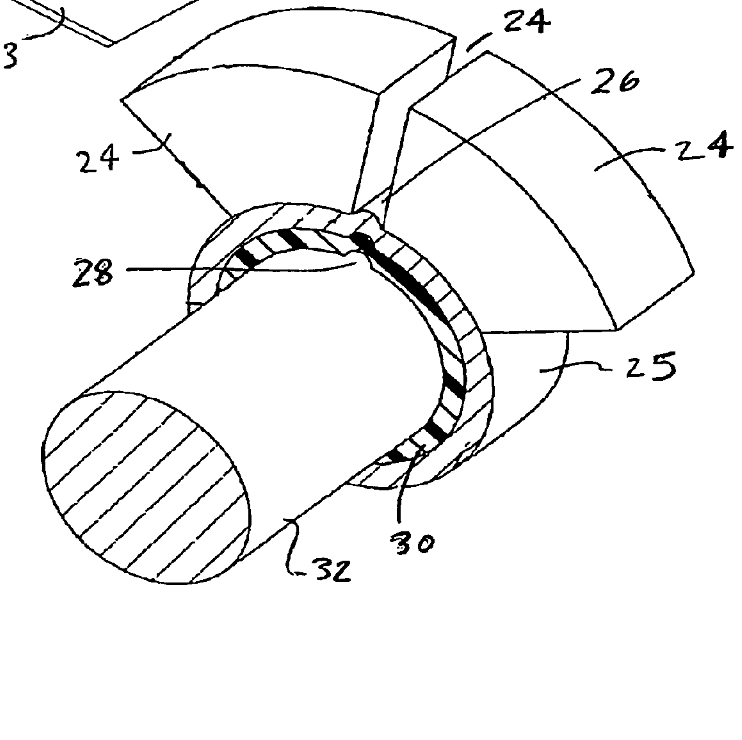
Fig. 4 PRIOR ART
FIG. 4 is a perspective view showing a clamping ring or ferrule folding up between jaws of the six-jaw die of FIG. 3.
Figure 5:
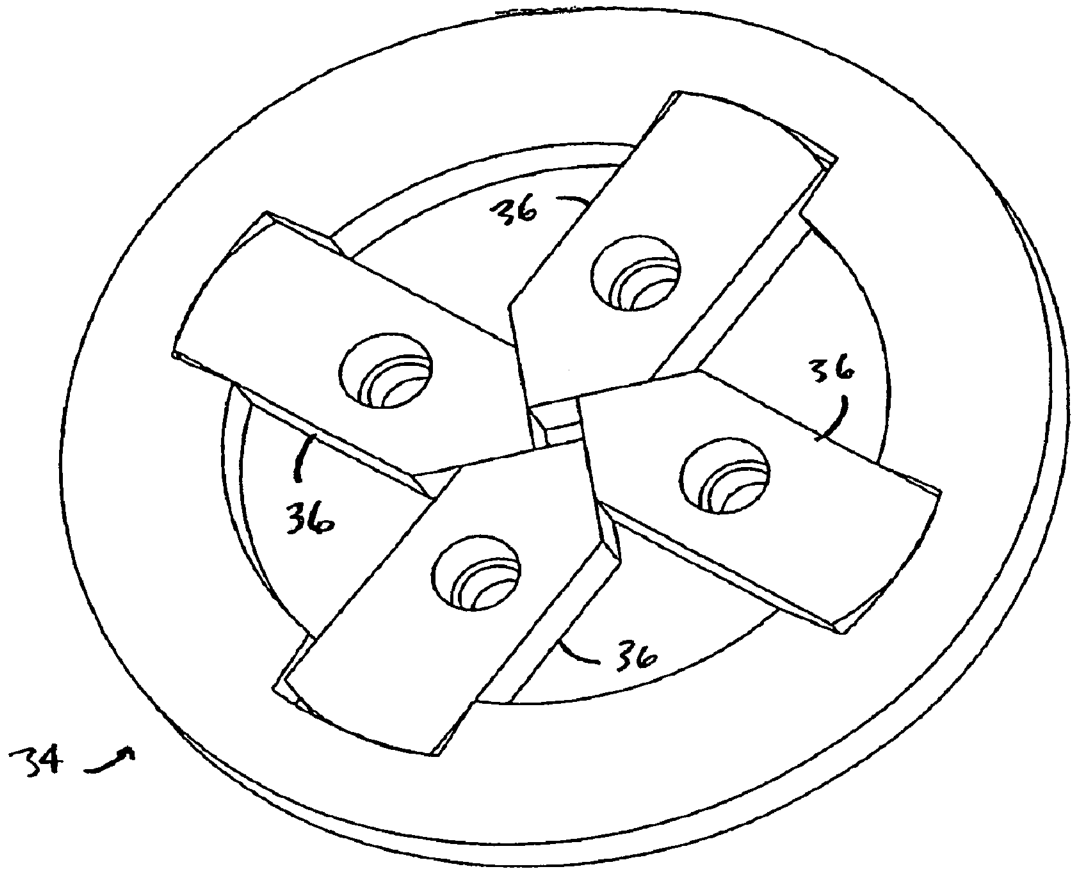
Fig. 5 PRIOR ART
FIG. 5 is a perspective view of a pivoting-jaw die of a prior art crimping device.

It should be understood that the appended drawings are not necessarily to scale, presenting a somewhat simplified representation of various preferred features illustrative of the basic principles of the invention. The specific design features of a crimping or swaging device as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the crimping or swaging device illustrated in the drawings. In general, in or inward refers to a radial direction toward the central axis of the outer work piece and out or outward refers to a radial direction away from the central axis of the outer work piece. Also in general, fore or forward refers to a direction toward the open end of the inner work piece to which the outer work piece is being crimped or swaged and rearward refers to a direction away from the open end of the inner work piece to which the outer work piece is being crimped or swaged.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved crimping or swaging devices disclosed herein. The following detailed discussion of various alternative and preferred embodiments will illustrate the general principles of the invention with reference to a crimping or swaging device for crimping a ferrule to clamp a hose onto a fitting such as a hose barb. Other embodiments and/or applications will be apparent to those skilled in the art given the benefit of this disclosure such as, for example, means for joining hoses, electrical connectors, stanchions, and the like.

Figure 6:
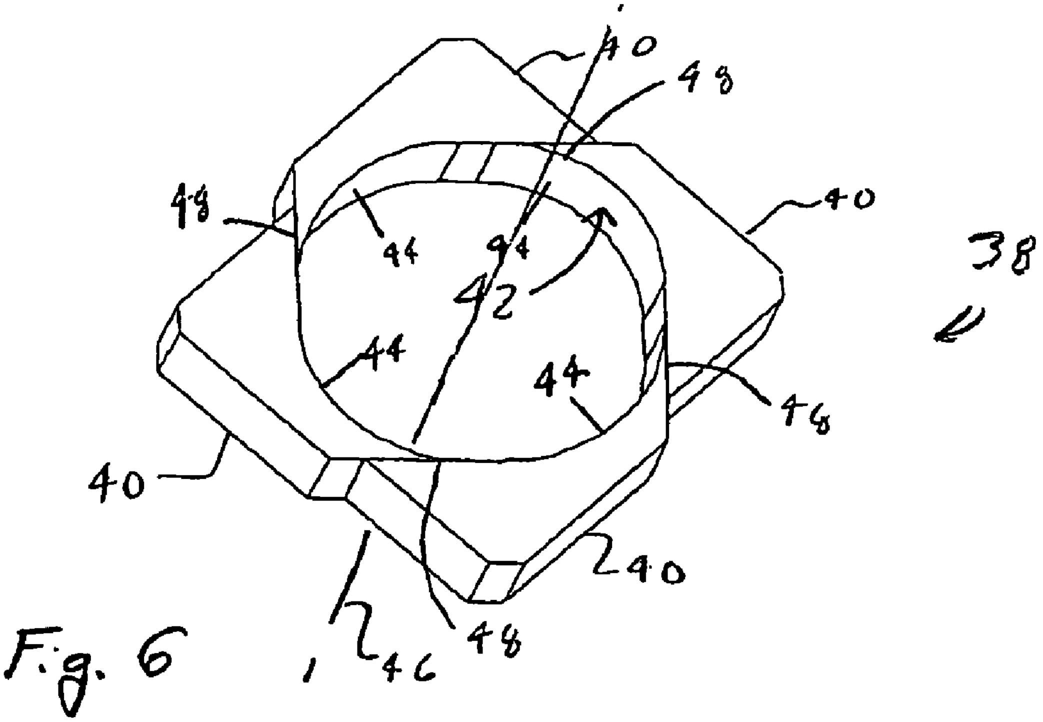
FIG. 6 is a perspective view of a crimping device according to a first embodiment of the present invention, wherein the jaws are in a partially closed position.
Figure 7:
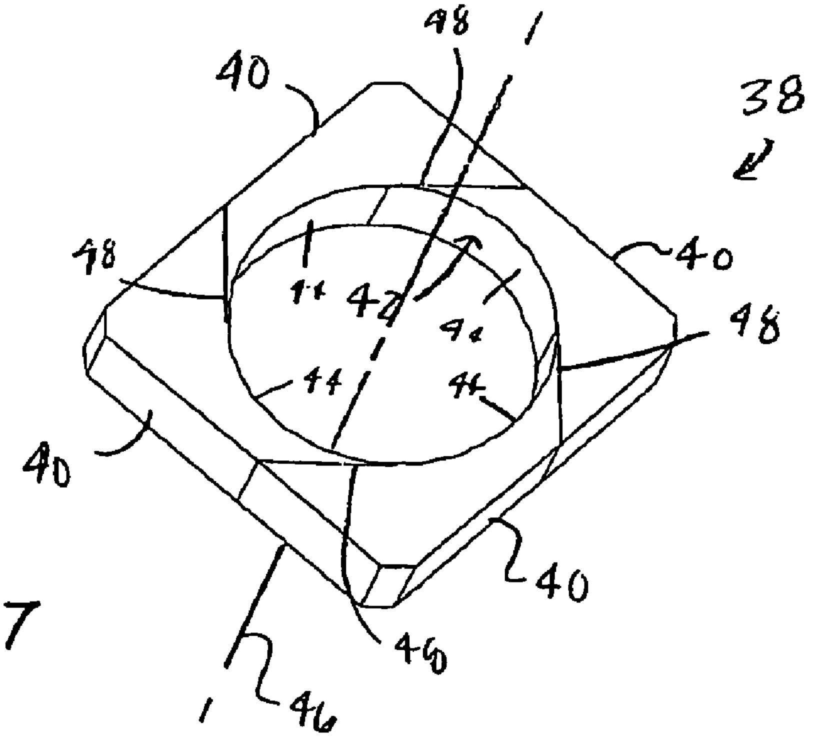
FIG. 7 is a perspective view of the crimping device of FIG. 6 wherein the jaws are in a fully closed position.
Figure 10:
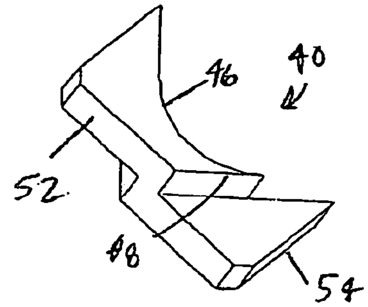
FIG. 10 is a perspective view of one of the jaws of the crimping device of FIGS. 8 and 9.
Figure 11:
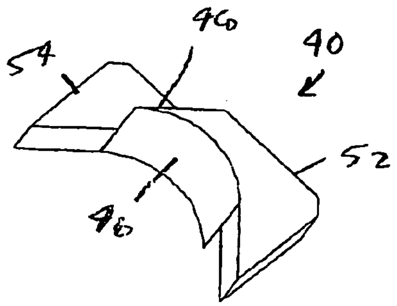
FIG. 11 is a perspective view of one of the jaws of the crimping device of FIGS. 8 and 9 showing a view opposite of the view shown in FIG. 10.
Figure 8:
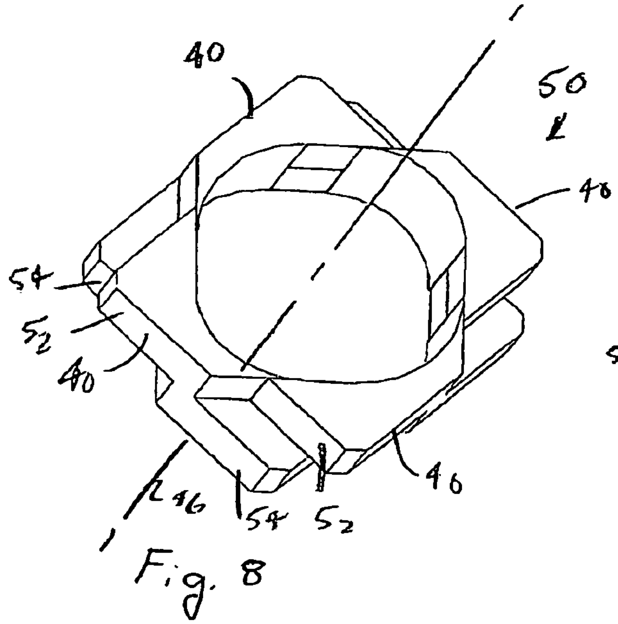
FIG. 8 is a perspective view of a crimping device according to a second embodiment of the present invention, wherein the jaws are in a partially closed position.
Figure 9:
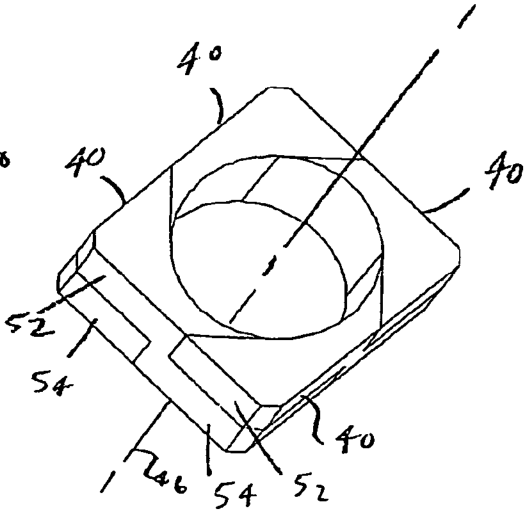
FIG. 9 is a perspective view of the crimping device of FIG. 8 wherein the jaws are in a fully closed position.

Referring now to the drawings, FIGS. 6 and 7 show a crimping or swaging device or crimper 38 for crimping or swaging a first or outer work piece onto a second or inner work piece located internal to and coaxial with the first work piece according to a first embodiment of the present invention. The crimping device 38 can produce a fully round, uniform crimp to form a fluid-tight seal between the first work piece and the second work piece with a hose or the like located therebetween. The crimping device 38 includes at least two dies or jaws 40 forming a substantially continuous throat or swaging surface 42 which defines a crimping throat within which the first work piece extends. The illustrated crimping device 38 includes four jaws 40 but a greater or lesser quantity of jaws can be utilized within the scope of the present invention. The jaws 40 are movable between a partially closed position (best shown in FIG. 6) wherein the first work piece is not crimped onto the second work piece and a fully closed position (best shown in FIG. 7) wherein the throat surface 42 of the jaws 40 engage and join the first work piece to the second work piece.

The illustrated jaws 40 are configured as a shutter mechanism about the first work piece so that the throat surface 42 remains continuous about the first work piece throughout the range of motion of the jaws 40. Each of the jaws 40 has a throat portion 44 that partially forms the throat surface 42. The throat surface 42 remains continuous in that the jaws 40 cooperate so that there are not any gaps or spaces in the throat surface 42 that can cause non-uniformities in the crimp. The illustrated throat surface 42 is entirely continuous as it encircles the first work piece and remains continuous during movement of the jaws 40. The illustrated jaws 40 each overlap adjacent jaws 40 in a radial direction and slide against each other as the jaws 40 radially move from the partially closed position to the closed position. That is, the illustrated jaws 40 have radial overlap. The term "radial overlap" is used in this specification and claims to mean adjacent jaw segments or jaws that at least partially form the continuous throat surface remain in contact with each other while the jaws are moved to their closed position against the first work piece. A section of the jaw is first contacting the work piece and then contacts the adjacent jaw as closure occurs. This sliding action withdraws the exposed surface of the jaw from exposure to the work piece. By this means, the total perimeter length of the throat is reduced while retaining substantially continuous contact between each of the jaws and the work piece. Each of the illustrated jaws 40 that form the throat surface 42 have radial overlap so that each of the jaws 40 remain in contact while moving from the partially closed position to the fully closed position. It is noted however, that less than all of the jaws 40 can be provided with radial overlap but at least two of the jaws 40 preferably are provided with radial overlap so that there is at least a mixture of jaws 40 having radial overlap and jaws 40 having non-radial overlap.

The illustrated jaws 40 move radially along a straight-line or linear path toward the longitudinal centerline 46 of the throat surface 42 as the jaws 40 move from the partially closed position to the fully closed position. Each of the illustrated jaws 40 travel in straight-line motion relative to the work piece and to the other jaws 40. It is noted, however, that all or some of the jaws 40 can travel in non-straight-line motion such as, for example, arc-shaped or curved motion. All of the jaws 40 can travel in curved or non-straight line motion while continuously maintaining sliding area contact between adjacent jaws 40. It is noted that the net change in relative angle differences must be zero between all of the jaws 40 while moving between fully open and fully closed positions in order to have continuous sliding area contact. In other words, any positive angular change between adjacent jaws 40 needs to be matched by a negative change between two or more of the other jaws 40. Curved motion between two jaws 40 means that the sliding and mating surfaces are circular and co-radial about an axis that is parallel to the crimper axis as describe in more detail hereinafter. It should be noted that straight-line and curved motion are similar in that straight line-motion is essentially curved motion with a very large radius.

The continuous throat surface 42 enables the circumference or perimeter of the first work piece to be continuously (locally) reduced around at least one circumferential path in contact with the crimper throat surface 42. This means that there are no sections along the path where the circumference of the work piece is allowed to increase in an outward direction. Nonuniformities such as pinches, bulges and the like would create sections where the circumference locally increases. It is noted that the path is continuously reduced both spatially (as described above) and temporally—the reduction increases continuously as the crimper is moved from the partially closed position to the fully closed position.

The illustrated jaws 40 are configured so that the throat surface 42 is circular-shaped when the jaws 40 are in the fully closed position to produce a fully round, that is circular-shaped, uniform crimp. It is noted, however, that the throat surface 42 can alternatively have any other suitable shape within the scope of the present invention.

The illustrated jaws 40 each have a thin edge section 48 partially forming the throat surface 42. The thin edge section 48 is located on one side of the throat portion 42. The thin edge section 48 enables the jaws 40 to effectively form a circular-shaped throat surface 42 when the jaws 40 are in the fully closed position. The thin edge sections 48 each slide against an adjacent one of the jaws 40 and receives support from the adjacent one of the jaws 40 to prevent deformation of the thin edge section 48. It is noted that the thin edge section 48 would deform and cause non-uniformities in the crimp if not supported by the adjacent jaws 40.

FIGS. 8 to 11 show a crimping or swaging device or crimper 50 for crimping or swaging a first or outer work piece onto a second or inner work piece located internal to and coaxial with the first work piece according to a second embodiment of the present invention. The crimping device 50 can produce a fully round, uniform crimp. The illustrated crimping device includes four jaws 40 but a greater or lesser quantity of jaws 40 can be utilized within the scope of the present invention. The jaws 40 are movable between a partially closed position (best shown in FIG. 8) wherein the first work piece is not crimped onto the second work piece and a fully closed position (best shown in FIG. 9) wherein the throat surface 42 of the jaws 40 engages and crimps the first work piece onto the second work piece.

The jaws 40 of the second embodiment illustrated that the jaws 40 can overlap in the longitudinal direction, that is, in the direction of the longitudinal axis 46 of the throat surface 42. The illustrated jaws 40 each have a pair of flanges 52, 54 on opposite sides of the jaw 40 that cooperates with the flanges 52, 54 of the adjacent jaws 40. The flanges 52, 54 of adjacent jaws 40 overlap in the axial or longitudinal direction and slide along each other as the jaws 40 move. The illustrated jaws 40 each have a forward flange 52 at one end that is located forward of a rearward flange 54 of the adjacent jaw and a rearward flange 54 at the other end that is located rearward of the forward flange 52 of the adjacent jaw. Configured in this manner, the flanges 52, 54 alternate on forward and rearward sides to interlock the jaws 40.

Figure 12:
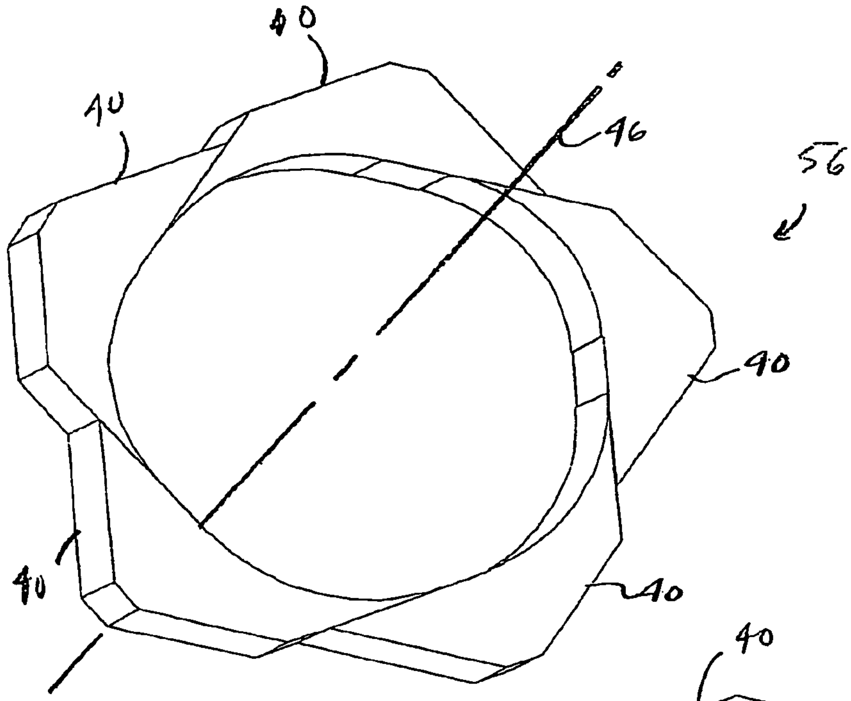
FIG. 12 is a perspective view of a crimping device according to a third embodiment of the present invention, wherein the jaws are in a partially closed position.
Figure 13:
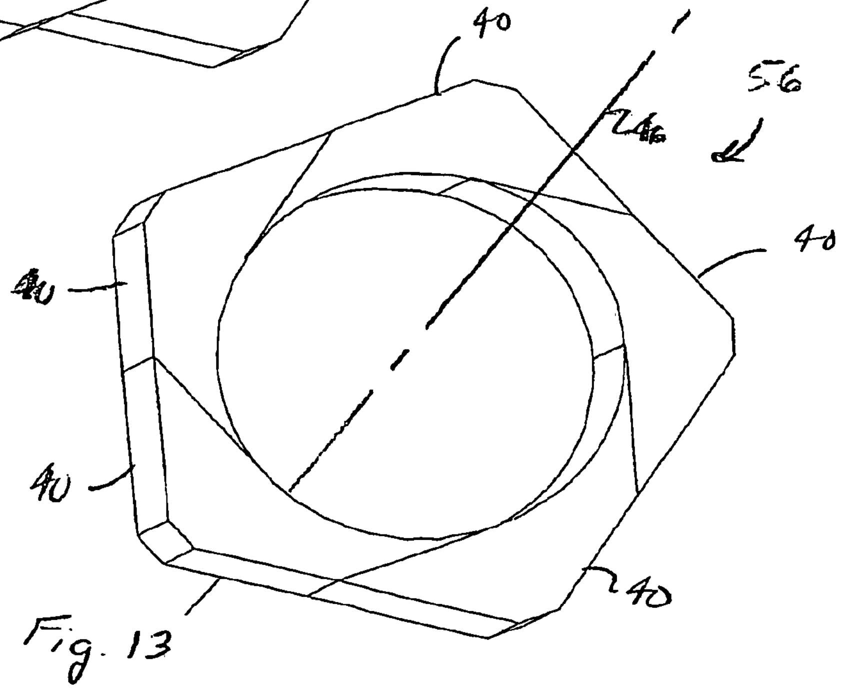
FIG. 13 is a perspective view of the crimping device of FIG. 12 wherein the jaws are in a fully closed position.

FIGS. 12 and 13 show a crimping or swaging device or crimper 56 for crimping or swaging a first or outer work piece onto a second or inner work piece located internal to and coaxial with the first work piece according to a third embodiment of the present invention. The crimping device 56 can produce a fully round, uniform crimp. The illustrated crimping device 56 includes five jaws 40 but a greater or lesser quantity of jaws 40 can be utilized within the scope of the present invention. The jaws 40 are movable between a partially closed position (best shown in FIG. 12) wherein the first work piece is not crimped onto the second work piece and a fully closed position (best shown in FIG. 13) wherein the jaws 40 engage and crimp the first work piece onto the second work piece.

The crimping device 56 of the third embodiment illustrates that there can be other suitable quantities of the jaws 40. There can be five of the jaws 40 as illustrated or any other suitable quantity.

Figure 14:
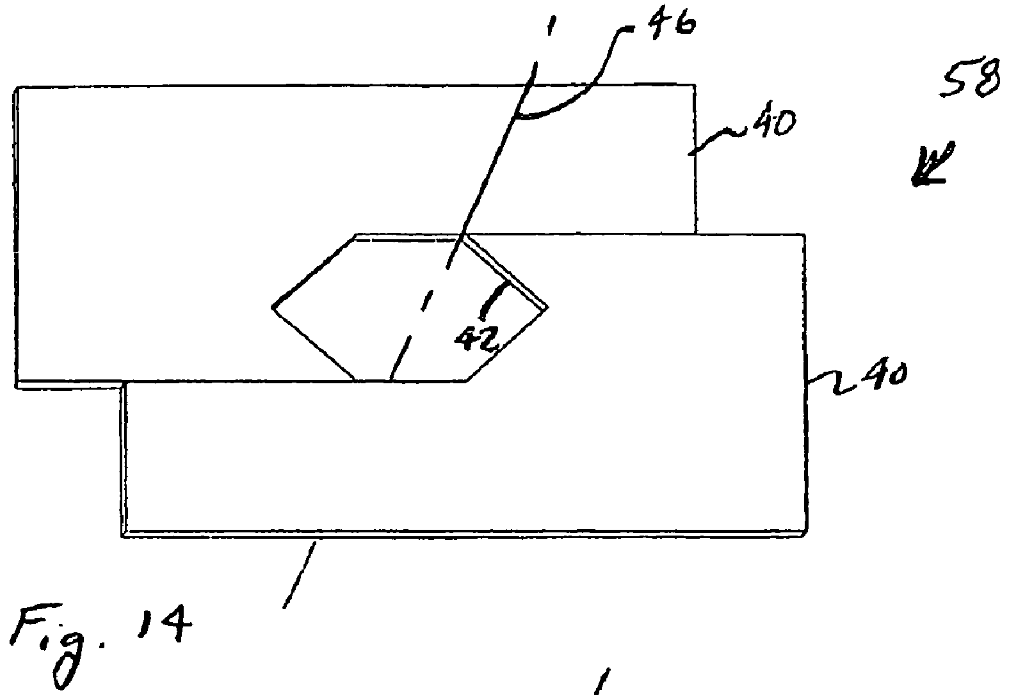
FIG. 14 is a perspective view of a crimping device according to a fourth embodiment of the present invention, wherein the jaws are in a partially closed position.
Figure 15:
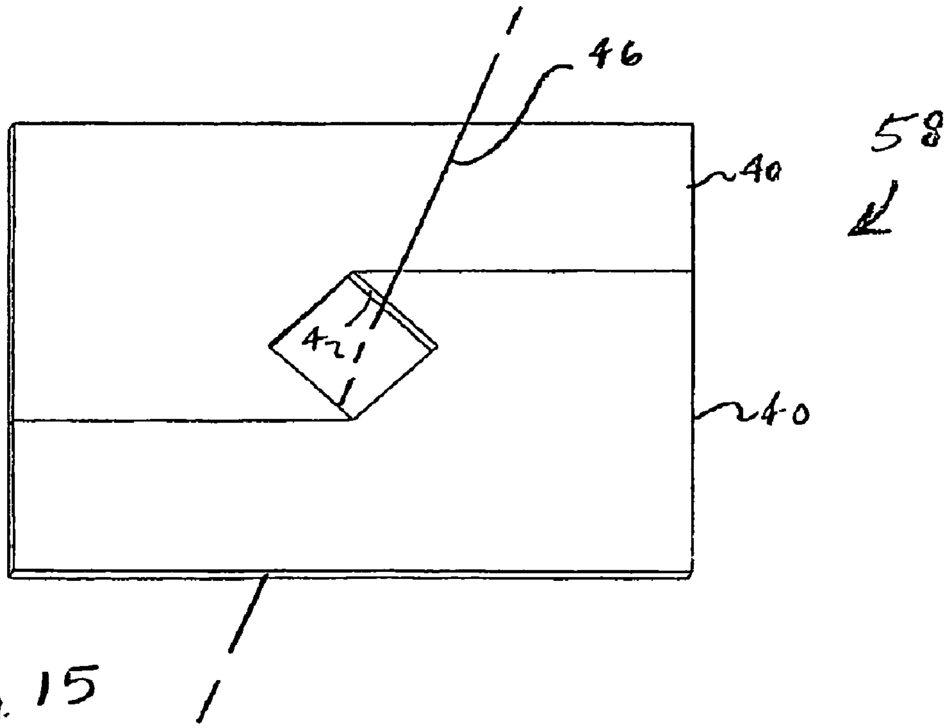
FIG. 15 is a perspective view of the crimping device of FIG. 14 wherein the jaws are in a fully closed position.

FIGS. 14 and 15 show a crimping or swaging device or crimper 58 for crimping or swaging a first or outer work piece onto a second inner work piece located internal to and coaxial with the first work piece according to a fourth embodiment of the present invention. The crimping device 58 can produce a fully polygonal-shaped, uniform crimp. The illustrated crimping device 58 includes two jaws 40 but a greater quantity of jaws 40 can be utilized within the scope of the present invention. The jaws 40 are movable between a partially closed position (best shown in FIG. 14) wherein the first work piece is not crimped onto the second work piece and a fully closed position (best shown in FIG. 15) wherein the jaws 40 engage and crimp the first work piece onto the second work piece.

The crimping device 58 of the fourth embodiment illustrates that there can be other suitable shapes of the throat surface 42. The throat surface 42 can be polygonal-shaped when the jaws 40 are in the closed position such as the illustrated square or any other suitable shape.

Figure 16:
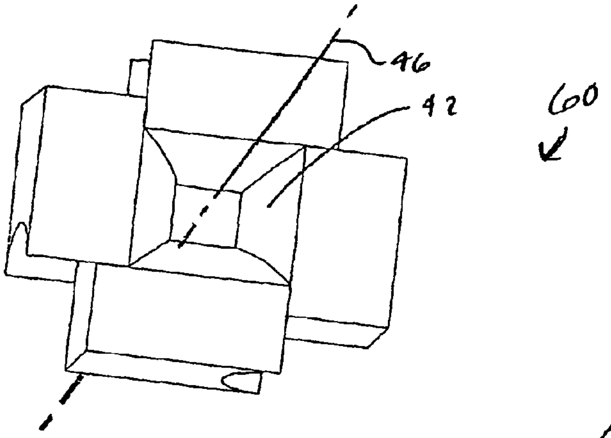
FIG. 16 is a perspective view of a crimping device according to a fifth embodiment of the present invention, wherein the jaws are in a mostly open position.
Figure 17:
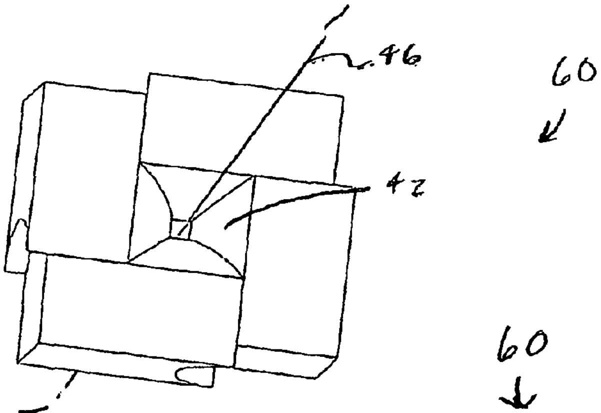
FIG. 17 is a perspective view of the crimping device of FIG. 16 wherein the jaws are in a partially closed position.
Figure 18:
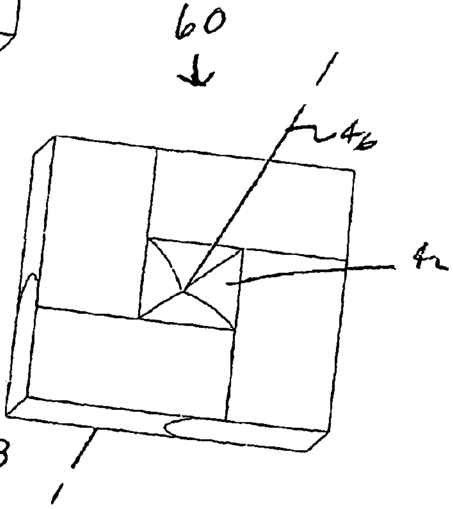
FIG. 18 is a perspective view of the crimping device of FIGS. 16 and 17 wherein the jaws are in a fully closed position.

FIGS. 16 to 18 show a crimping or swaging device or crimper 60 for crimping or swaging a first or outer work piece onto a second or inner work piece located internal to and coaxial with the first work piece according to a fifth embodiment of the present invention. The crimping device 60 can produce a fully uniform crimp. The illustrated crimping device includes four jaws 40 but a greater or lesser quantity of jaws 40 can be utilized within the scope of the present invention. The jaws 40 are movable between mostly open position (best shown in FIG. 16) wherein the first work piece is not crimped onto the second work piece and a fully closed position, a partially closed position (best shown in FIG. 17) wherein the first work piece is not crimped onto the second work piece, and a fully closed position (best shown in FIG. 18) wherein the jaws 40 engage and crimp the first work piece onto the second work piece.

The crimping device 60 of the fifth embodiment illustrates that the throat surface 42 can be tapered. The illustrated throat surface 42 is tapered wherein a distance between the throat surface 42 and the longitudinal axis or centerline 46 of the throat surface 42 varies in the axial or longitudinal direction.

Figure 19:
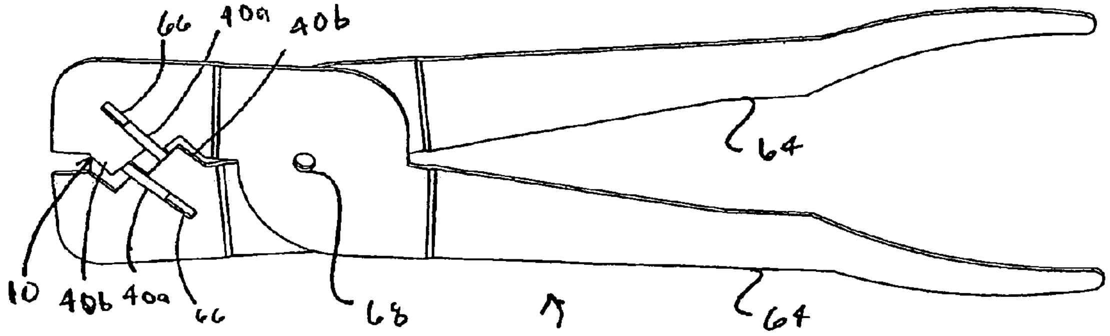
FIG. 19 is a perspective view of a crimping device according to a sixth embodiment of the present invention.

FIG. 19 shows a crimping or swaging device or crimper 62 for crimping or swaging a first or outer work piece onto a second or inner work piece located internal to and coaxial with the first work piece according to a sixth embodiment of the present invention. The illustrated crimping device 62 includes four jaws 40 but a greater or lesser quantity of jaws 40 can be utilized within the scope of the present invention. The illustrated jaws 40 are manually movable between a partially closed position (best shown in FIG. 19) wherein the first work piece is not crimped onto the second work piece and a fully closed position (not shown) wherein the jaws 40 engage and crimp the first work piece onto the second work piece. Upon manually actuating the handles 64, the jaws 40 move to the fully closed position. Two of the illustrated jaws 40*a* move in straight-line paths relative to the adjacent jaws 40*b* along slots 66 while the two adjacent jaws 40*b* move along arc-shaped paths relative to the work piece about the handle pivot 68. The crimping device 62 of the sixth embodiment illustrates that less than all of the jaws 40 can move in straight line motion relative to the work piece when at least one of the jaws 40*a* moves relative to at least one of the adjacent jaws 40*b*, that is, when at least two adjacent jaws 40*a*, 40*b* move in straight-line motion relative to one another.

The crimping device 62 of the sixth embodiment illustrates also illustrates that the jaws 40 can be adapted for side entry of at least one work piece into the crimping throat. At least two of the jaws 40 can be separated for entry of at least one of the work pieces into the crimping throat in a radial direction between the separated jaws 40. It is noted that the interlocking relationships of the jaws provided by axial/longitudinal overlap as described hereinabove, can be utilized to coordinate the jaws 40 upon closing. Side or radial direction entry is important in applications where at least one of the work pieces is relatively long and the crimp is not made near an end of the work piece which makes it difficult and or time consuming to insert the work piece into the crimping throat in a longitudinal direction.

Figure 20:
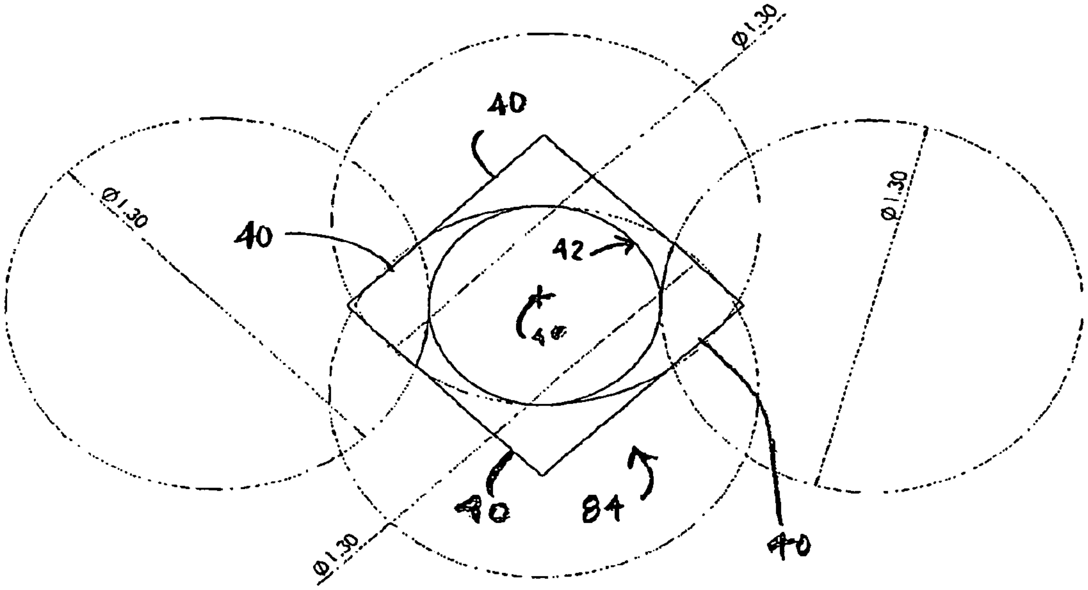
FIG. 20 is a perspective view of a crimping device according to a seventh embodiment of the present invention, wherein the jaws are in a fully closed position.
Figure 21:
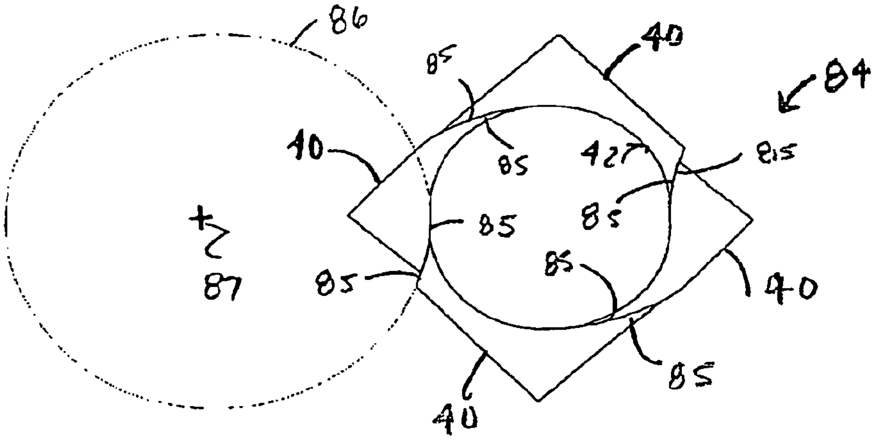
FIG. 21 is a perspective view of the crimping device of FIG. 20 wherein the jaws are in a partially open position.
Figure 22:
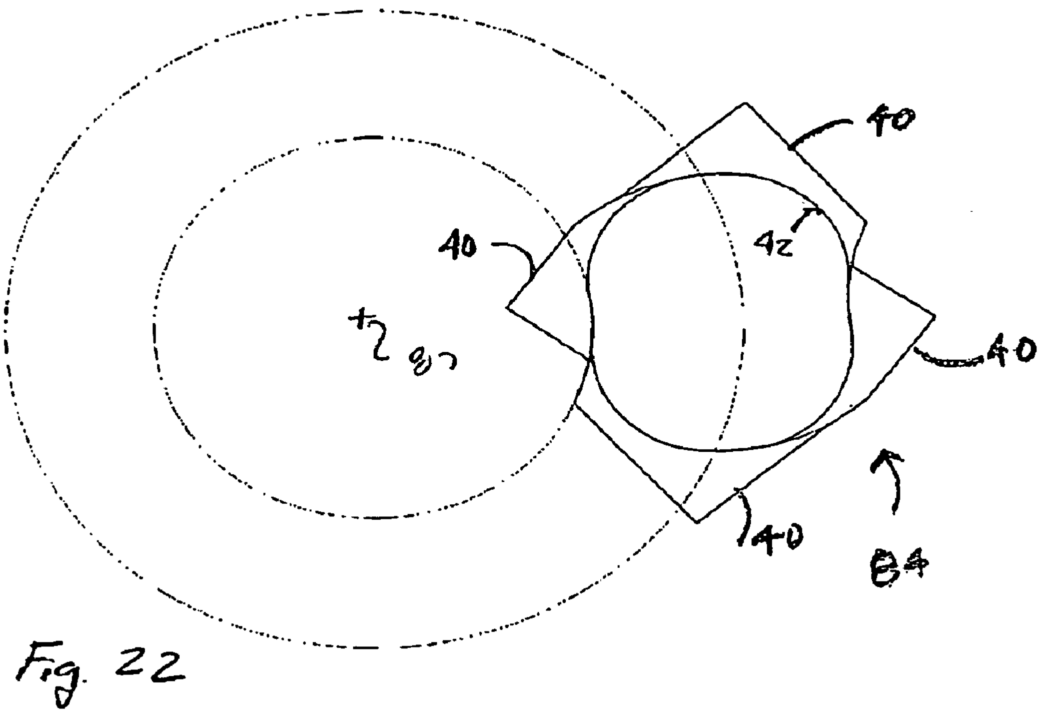
FIG. 22 is a perspective view of the crimping device of FIGS. 20 and 21 wherein the jaws are in a nearly fully open position.
Figure 23:
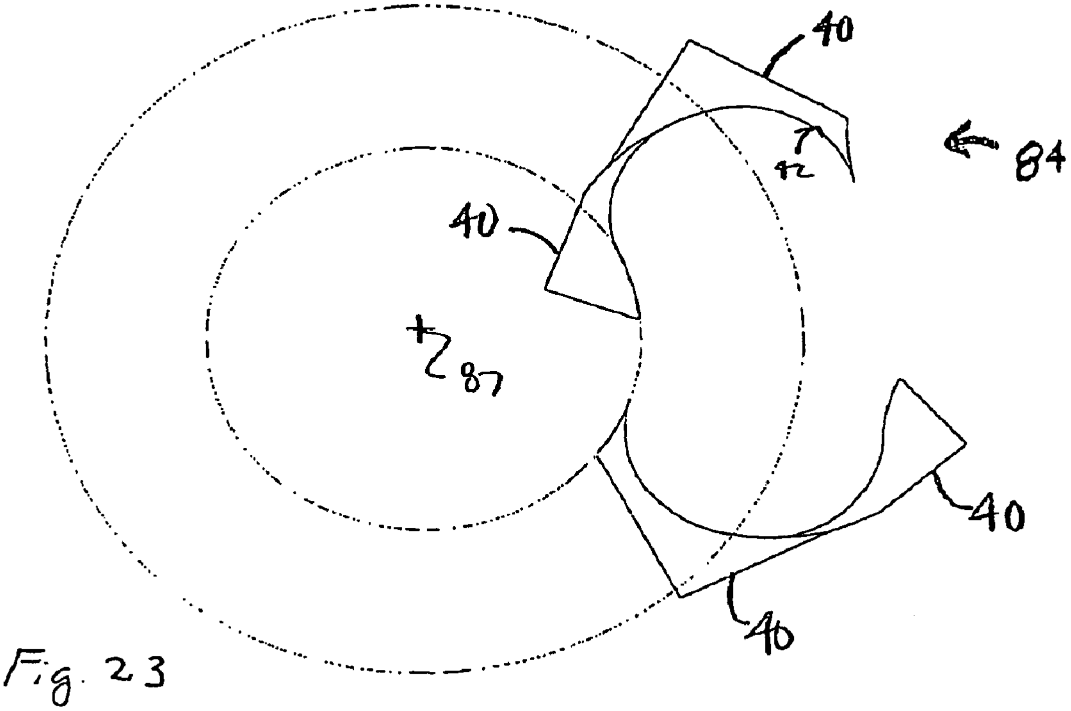
FIG. 23 is a perspective view of the crimping device of FIGS. 20 to 22 wherein the jaws are in a fully open position.

FIGS. 20 to 22 show a crimping or swaging device or crimper 84 for crimping or swaging a work piece according to a seventh embodiment of the present invention. The crimping device 84 can produce a fully uniform crimp. The illustrated crimping device 84 includes four jaws 40 but a greater or lesser quantity of jaws 40 can be utilized within the scope of the present invention. The jaws 40 are movable between a fully open position (best shown in FIG. 23) wherein an opening is created between two of the jaws so that the work can be inserted into and/or withdrawn from the throat in a radial direction through the opening between the separated jaws 40, a partially closed position (best shown in FIG. 22) wherein the work piece is not crimped, a further partially closed position (best shown in FIG. 21) wherein the work piece is not crimped, and a fully closed position (best shown in FIG. 20) wherein the jaws 40 engage and crimp the work piece.

The crimping device 84 of the seventh embodiment illustrates that the jaws 40 can move with curved motion rather than straight-line motion. The primary advantage of curved motion is that the jaws 40 can be supported and easily opened and closed by a pivoting plier-like handle mechanism. This can be described as the jaws 40 moving in circular translation. The illustrated contact surfaces or areas of contact 85 between the jaws 40 are circular-shaped, that is, the surface is defined by a radius, so that the adjacent jaws 40 can rotate relative to one another and remain in continuous sliding area contact as they rotate. The axis of each contact surface 85 is parallel to the central axis 46 of the throat surface 42 so that each of the jaws 40 rotates relative to at least one of the other jaws 40 in a plane normal to the central axis 42. The mating surfaces of opposing convex and concave contact surfaces 85 are of equal radii. The illustrated embodiment has the same size radius for each pair of the mating surfaces 85 but alternatively the pairs can each have a radius of a different size as discussed in more detail hereinafter. Any number of radius combinations are believed to be possible. The jaws 40 move along a curved or circular path defined by the contact surfaces 85. The dashed circle 86 in FIG. 21 shows a circular path that two of the jaws 40 follow when the throat is opened and closed. This dashed circle 86 is also coaxial with the pivot axis 87 of the illustrated crimper device 84.

When the jaws slide in relation to each other, the angular displacements are such that intimate contact or sliding area contact is continuously maintained between the mating contact surfaces 85. "Intimate contact" or sliding area contact" is used in the specification and claims to mean area contact between to surfaces that is maintained as the two surfaces slide along each other. There is forced coordination of the jaws 40 as the throat is opened and closed because for any given amount of opening, there is only is one location for each of the jaws 40 in order to continuously maintain sliding area contact between all of the mating surfaces. In order that all the jaws remain in sliding area contact, there must be a compensating and opposite change in angle between other pairs of jaws 40. If you move the position of one of the jaws 40, all of the others must move to maintain a no net change in relative angle. It is noted that in linear or straight-line moving jaw systems, for any given relative position of a pair of jaws 40, the other pairs of jaws 40 can be in any number of positions. Given that straight-line motion results in no angular change, there is no consequent need for compensating angular change. Thus two pairs of jaws 40 can open in the X direction while the other two pairs of jaws 40 remain unchanged in the Y direction while continuously maintaining sliding area contact.

Figure 24:
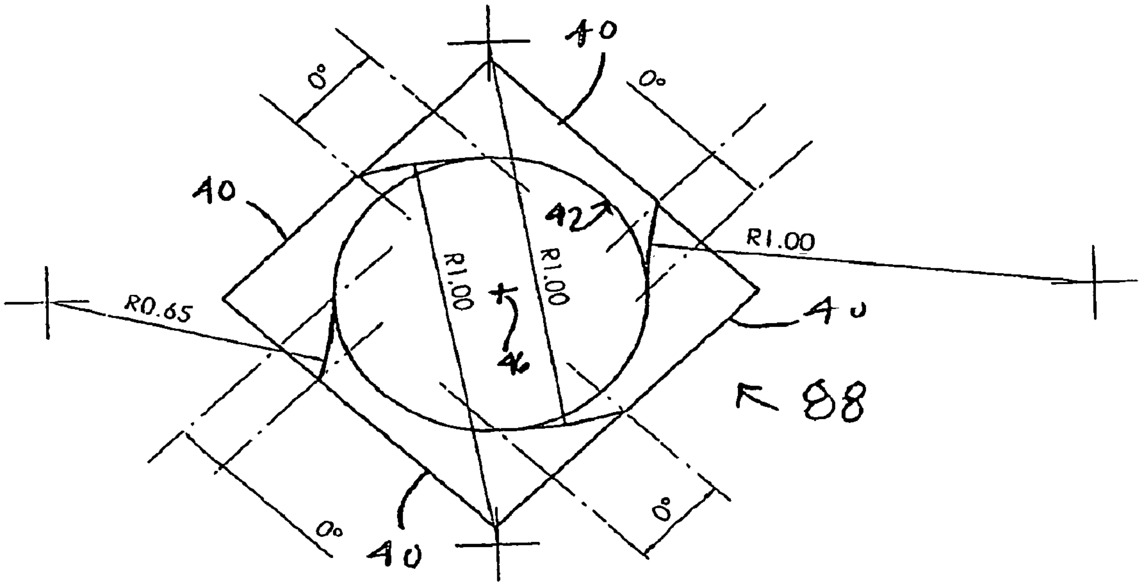
FIG. 24 is a perspective view of a crimping device according to a eighth embodiment of the present invention, wherein the jaws are in a fully closed position.
Figure 25:
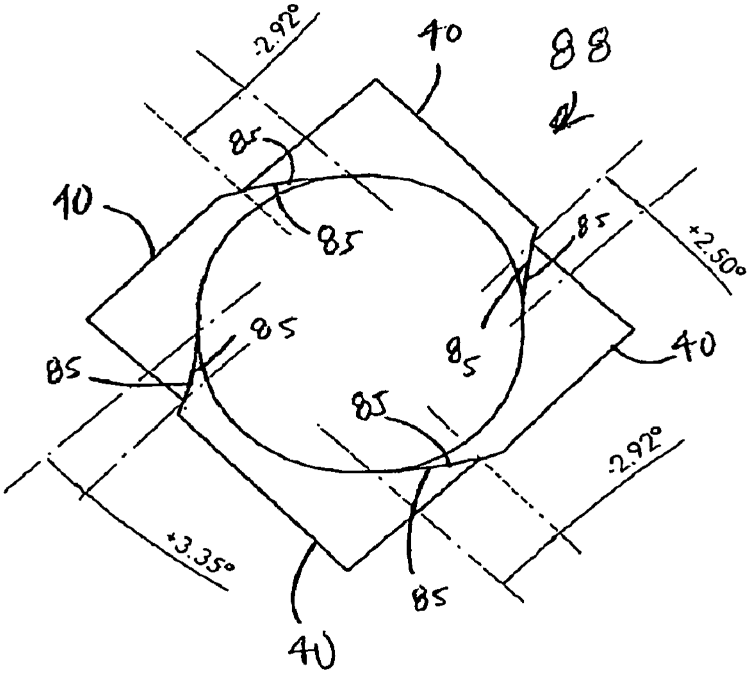
FIG. 25 is a perspective view of the crimping device of FIG. 24 wherein the jaws are in a partially open position.
Figure 26:
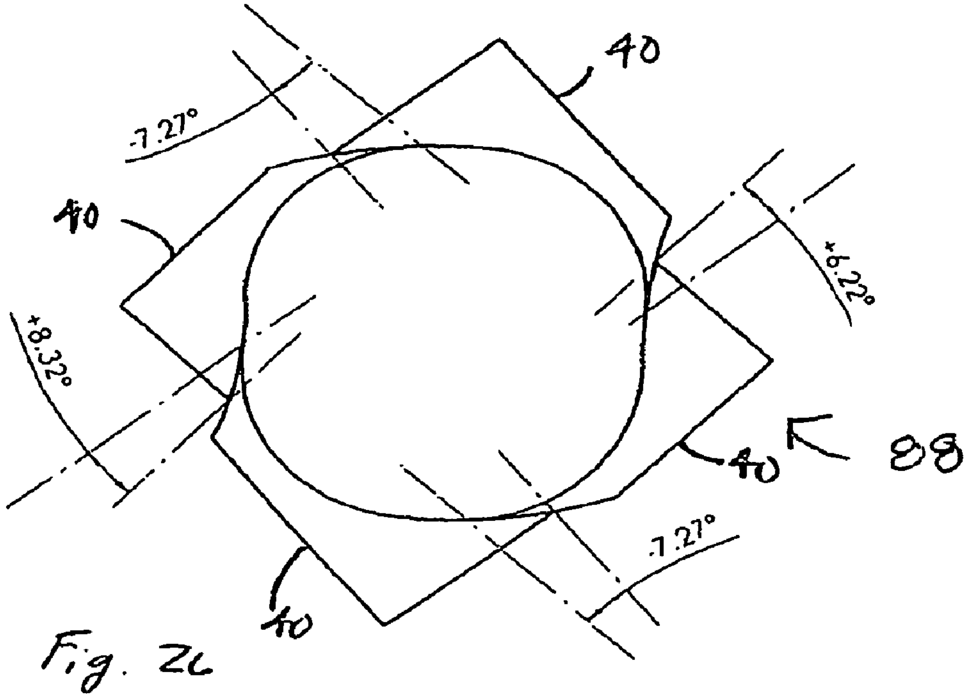
FIG. 26 is a perspective view of the crimping device of FIGS. 23 and 24 wherein the jaws are in an open position.
Figure 27:
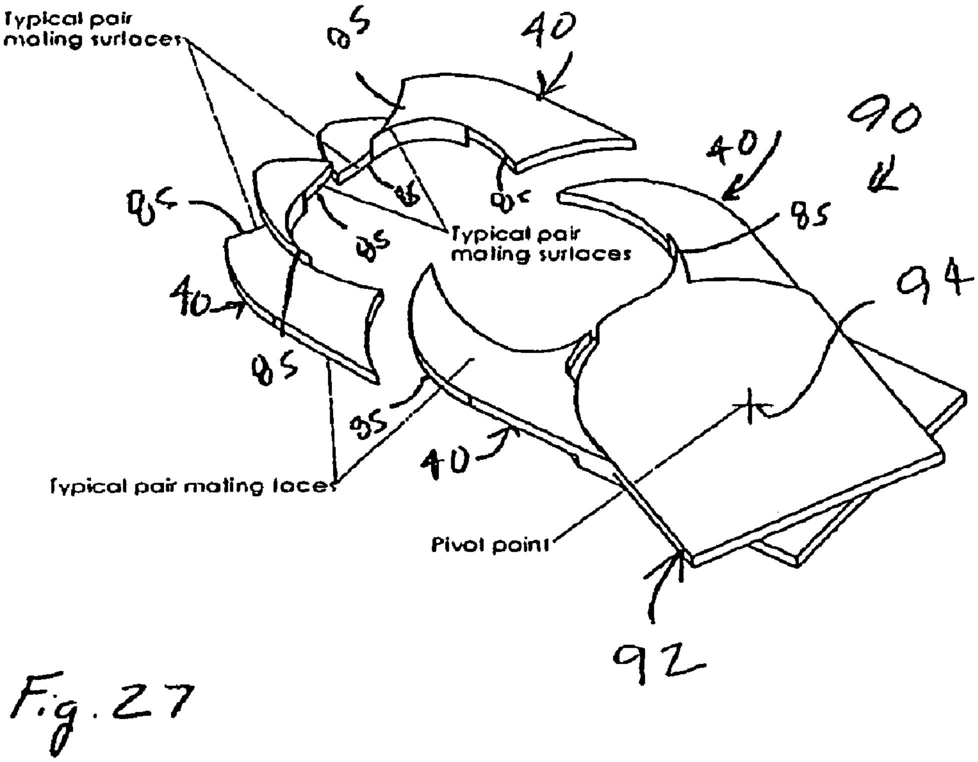
FIG. 27 is a perspective, exploded view of a crimping device according to a ninth embodiment of the present invention.
Figure 28:
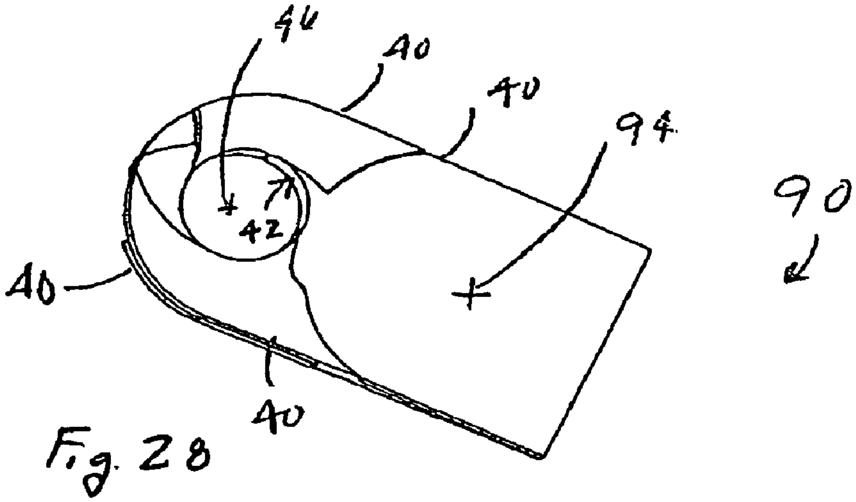
FIG. 28 is a perspective view of the crimping device of FIG. 27 wherein the jaws are in a fully closed position.
Figure 29:
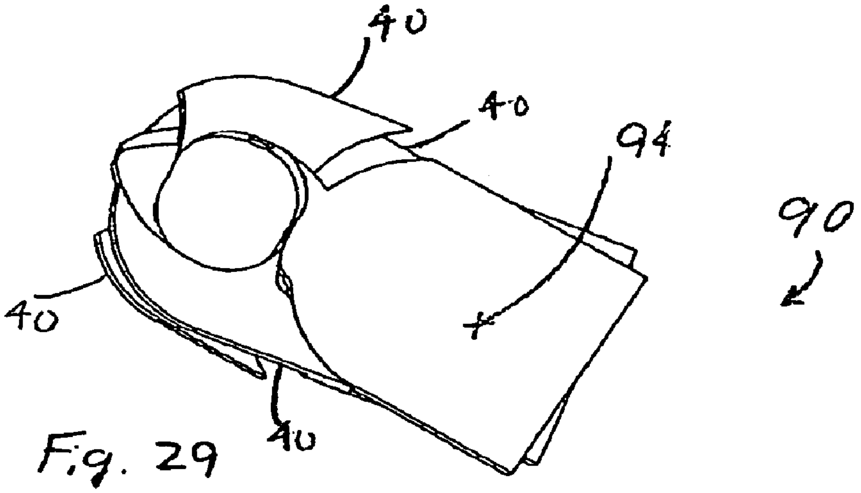
FIG. 29 is a perspective view of the crimping device of FIGS. 27 and 28 wherein the jaws are in a partially open position.
Figure 30:
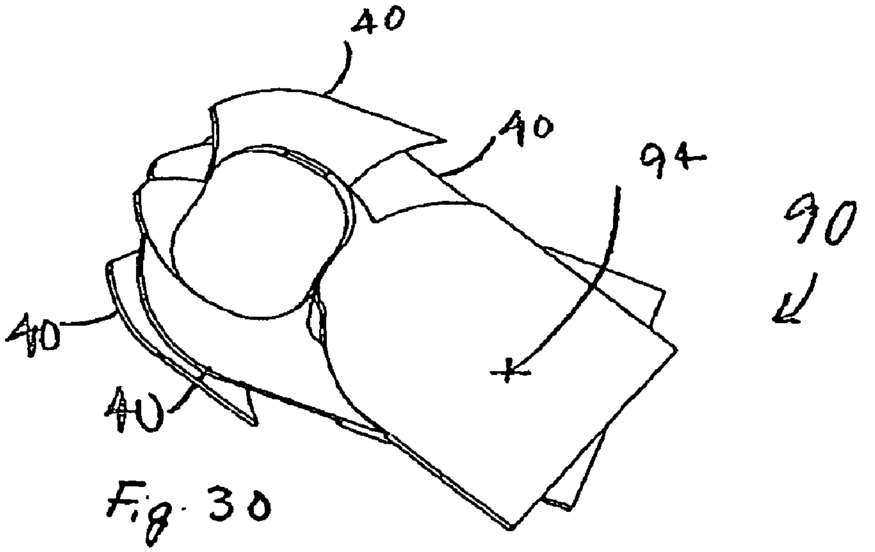
FIG. 30 is a perspective view of the crimping device of FIGS. 27 to 29 wherein the jaws are in an open position.

FIGS. 24 to 26 show a crimping or swaging device or crimper 88 for crimping or swaging a work piece according to an eighth embodiment of the present invention. The crimping device 88 can produce a fully uniform crimp. The illustrated crimping device 88 includes four jaws 40 but a greater or lesser quantity of jaws 40 can be utilized within the scope of the present invention. The jaws 40 are movable between mostly open position (best shown in FIG. 26) wherein the work piece is not crimped, a partially closed position (best shown in FIG. 25) wherein the work piece is not crimped, and a fully closed position (best shown in FIG. 24) wherein the jaws 40 engage and crimp the work piece.

The crimping device 88 of the eighth embodiment illustrates that the radiuses of the mating pairs of the jaw contact surfaces 85 can be unequal. The illustrated embodiment has three pairs of mating contact surfaces 85 having a radius of 1.00 and one pair of mating contact surfaces 85 with a radius of 0.65 but it is noted that any other suitable combination and size of radiuses can be alternatively utilized. The unequal radiuses cause the jaws 40 to slide at different rates as needed to satisfy the requirement for no net change in total angle so long as the jaws 40 remain in intimate contact. Each angle line is fixed to its respective jaw 40, arbitrarily and normal to a flat external edge. With the jaws 40 in the fully closed position, the pairs jaws 40 are each at a relative angle of 0 degrees (best shown in FIG. 24). As the illustrated jaws 40 begin to open, two of the pairs of jaws 40 experience a positive angular displacement and the other two pairs of jaws 40 experience a negative angular displacement which results in a total net angular change of zero (best shown in FIG. 25). As the jaws 40 continue to open, the jaws 40 move so that total net angular change remains zero (best shown in FIG. 26).

FIGS. 27 to 30 show a crimping or swaging device or crimper 90 for crimping or swaging a work piece according to a ninth embodiment of the present invention. The crimping device 90 can produce a fully uniform crimp. The illustrated crimping device 90 includes four jaws 40 but a greater or lesser quantity of jaws 40 can be utilized within the scope of the present invention. The jaws 40 are movable between mostly open position (best shown in FIG. 30) wherein the work piece is not crimped, a partially closed position (best shown in FIG. 29) wherein the work piece is not crimped, and a fully closed position (best shown in FIG. 28) wherein the jaws 40 engage and crimp the work piece.

The crimping device 90 of the ninth embodiment illustrates that the jaws 40 can have both radial and longitudinal overlap and curved motion supplied by a plier-type mechanism 92. With both radial and longitudinal overlap, the jaws 40 become interlocked and are constrained to slide along a path defined by the curved mating surfaces 85 that remain in intimate contact. The pivot axis 94 of the plier-type mechanism 92 is coaxial with the curved motion of the jaws 40. Furthermore, the forced coordination of the jaws 40 simplifies the overall design because each of the jaws 40 drives the neighboring jaw 40 to move along with the group instead of requiring a separate drive mechanism.

Figure 31:
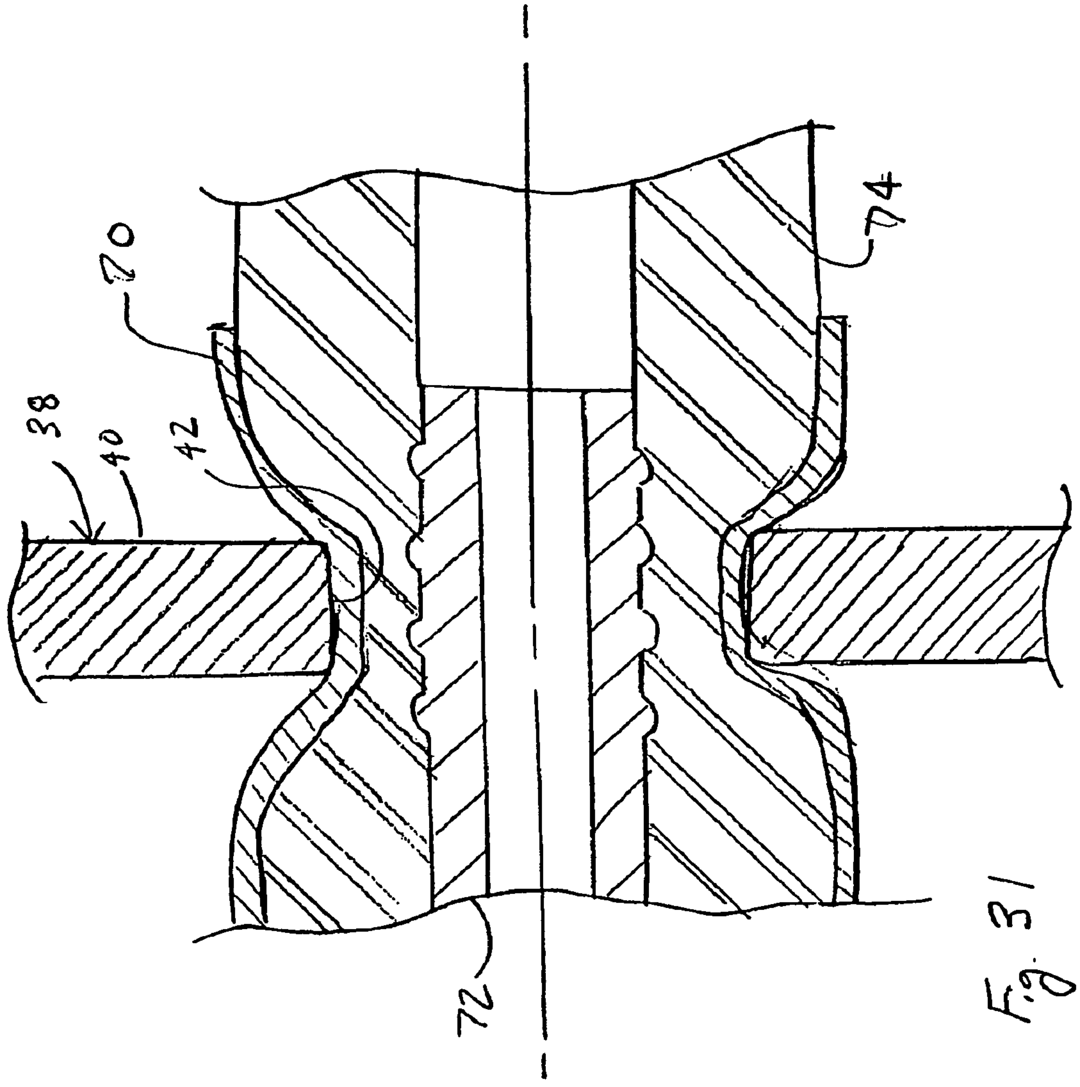
FIG. 31 is a cross-sectional view showing a crimping device according to the present invention crimping a ferrule to a fitting to clamp a hose to the fitting.

As best shown in FIG. 31, the first work piece can be a ferrule 70 and the second work piece can be a fitting 72, such as the illustrated hose barb, with an additional or third work piece 74, such as the illustrated hose, extending between the ferrule 70 and the fitting 72 so that the hose 74 is clamped between the ferrule 70 and the fitting 72. It is noted that the additional or third work piece can have other suitable forms such as, for example, tubes, conduits, cables, or the like. It is also noted that the crimping devices of the present invention can join two items by deforming one of the items onto the other through swaging or can join two or more coaxial, deformable items through co-swaging. Thus, the crimping devices of the present invention can cause one or more work pieces to be deformed. It should be noted that the crimping devices produce a fully round, uniform crimp on the ferrule 70 to form a fluid-tight seal between the ferrule 70 and the fitting 72, that is, both between the ferrule 70 and the hose 74 and between the hose 74 and the fitting 72. The fluid-tight seal formed by the crimp in the ferrule 70 seals an otherwise unsealed path against the passage of fluids (liquids and gasses).

Figure 33:
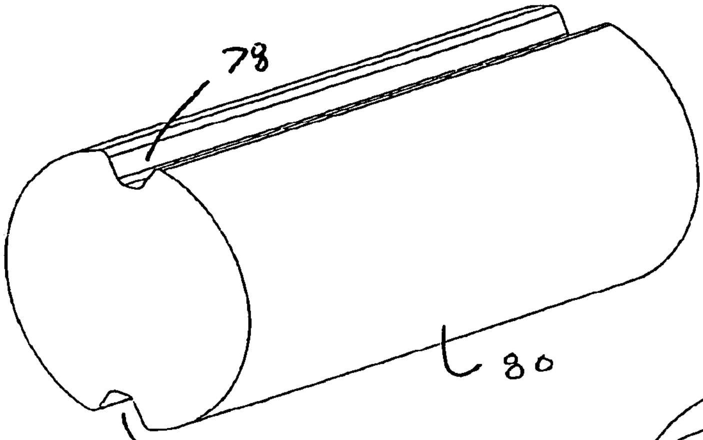
FIG. 33 is a perspective view of the spline shaft of FIG. 32 with the ferrule removed for clarity.
Figure 34:
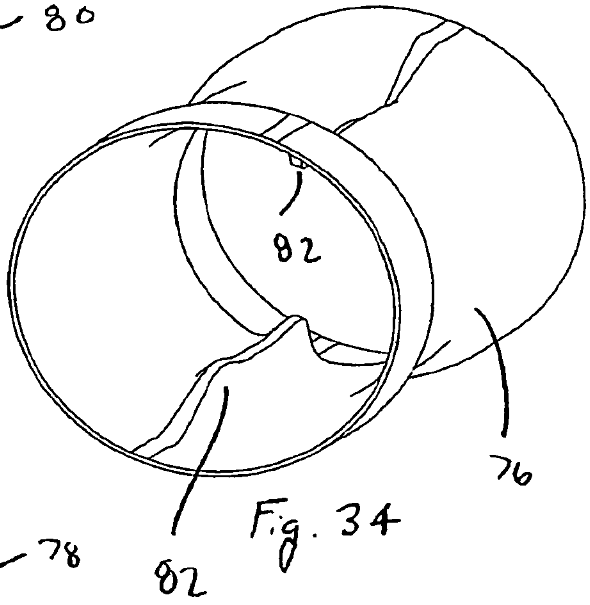
FIG. 34 is a perspective view of the ferrule of FIG. 32 with the spline shaft removed for clarity.
Figure 32:
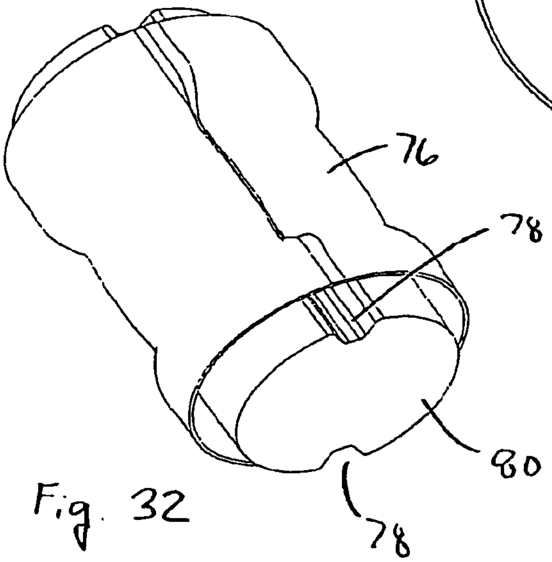
FIG. 32 is a perspective view of a ferrule crimped to a spline shaft by a crimping device according to the present invention.

As best shown in FIGS. 32 to 34, the above-described crimpers can be utilized to flow material of an outer or first work or ferrule 76 piece into concavities 78 of on an irregularly shaped inner or second work piece 80 such as, for example, a spline groove or keyway of a shaft. The crimper forces the outer work piece 76 to fold or flow into the concavity to join the outer work piece to the inner work piece 80. A fold or protrusion 82 is formed internally on the outer work piece 80. This notably does not require registration of the convexities on the crimper with the concavities 78 of the inner work piece 80. This avoids the necessity for a registered die that creates dents in the outer work piece to from inner protrusions aligned with the concavities of the inner work piece.

From the foregoing disclosure it will be apparent that the present invention provides a crimping or swaging device having a substantially continuous throat surface throughout the crimping process to deform one or more item to produce a fully uniform crimp without ridges, bends and/or non-uniformities. The substantially continuous throat of the present invention provides uniform compression geometry about the work piece as opposed to the non-uniform compression geometry of prior art systems.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A crimping device for crimping a first work piece onto a second work piece located internal to said first work piece, said crimping device comprising, in combination:

at least two jaws forming a throat surface about the first work piece and movable between a partially closed position wherein the first work piece is not crimped onto the second work piece and a closed position wherein the jaws engage and crimp the first work piece onto the second work piece to form a fluid-tight seal;

wherein the throat surface is substantially continuous about the first work piece as the jaws move from the partially closed position to the closed position;

wherein at least one of the jaws moves in straight line motion as the jaws move from the partially closed position to the closed position;

wherein the jaws overlap in a longitudinal direction of the throat surface and slide against each other as the jaws move from the partially closed position to the closed position;

wherein the overlap of the jaws in the longitudinal direction interlocks each of the jaws with adjacent jaws to constrain the jaws against longitudinal movement relative to one another in both longitudinal directions and coordinates movement of the jaws so that each of the jaws can only move along one sliding path relative to adjacent jaws; and wherein the throat surface has a longitudinal centerline and the overlap of the jaws in the longitudinal direction is formed by planar contact between the jaws substantially perpendicular to the longitudinal centerline.

2. The crimping device according to claim 1, wherein at least two of the jaws radially overlap and slide against each other as the jaws move from the partially closed position to the closed position.

3. The crimping device according to claim 2, wherein each of the jaws radially overlap and slide against each other as the jaws move from the partially closed position to the closed position.

4. The crimping device according to claim 1, wherein the throat surface continuously reduces a circumference of the outer work piece around at least one circumferential path.

5. The crimping device according to claim 1, wherein each of the jaws move in straight-line motion as the jaws move from the partially closed position to the closed position.

6. The crimping device according to claim 1, wherein at least one of the jaws has a thin edge section partially forming the throat surface and the thin edge section slides against an adjacent one of the jaws and receives support from the adjacent one of the jaws to prevent deformation of the thin edge.

7. The crimping device according to claim 1, wherein the throat surface is tapered.

8. The crimping device according to claim 7, wherein a distance between the throat surface and the longitudinal centerline of the throat surface varies in an axial direction.

9. The crimping device according to claim 1, wherein there are at least four jaws forming the throat surface.

10. The crimping device according to claim 1, wherein the throat surface is circular-shaped when the jaws are in the closed position.

11. The crimping device according to claim 1, wherein the throat surface is a polygonal-shaped when the jaws are in the closed position.

12. The crimping device according to claim 1, wherein the jaws are configured as a shutter mechanism about the first work piece.

13. The crimping device according to claim 1, wherein the jaws slide against each other as the jaws move from the partially closed position to the closed position.

14. The crimping device according to claim 1, wherein the first work piece is an outer work piece and the second work piece is a fitting and a hose extends between the outer work piece and the fitting.

15. The crimping device according to claim 1, wherein at least two of the jaws separate for entry of at least one of the first work piece and the second work piece in a radial direction between the separated jaws.

16. The crimping device according to claim 1, wherein the overlap of the jaws in the longitudinal direction interlocks the jaws to constrain the jaws in all directions except a direction of sliding against each other as the jaws move from the partially closed position to the closed position so that the interlock coordinates movement of the jaws.

17. A crimping device for crimping a first work piece onto a second work piece located internal to said first work piece, said crimping device comprising, in combination:

at least two jaws forming a throat surface about the first work piece and movable between a partially closed position wherein the first work piece is not crimped onto the second work piece and a closed position wherein the jaws engage and crimp the first work piece onto the second work piece;

wherein the throat surface is substantially continuous about the first work piece as the jaws move from the partially closed position to the closed position;

wherein at least two of the jaws overlap in a longitudinal direction of the throat surface and slide against each other as the jaws move from the partially closed position to the closed position;

wherein the overlap of the jaws in the longitudinal direction interlocks each of the jaws with adjacent jaws to constrain the jaws against longitudinal movement relative to one another in both longitudinal directions and coordinates movement of the jaws so that each of the jaws can only move along one sliding path relative to adjacent jaws; and wherein the throat surface has a longitudinal centerline and the overlap of the jaws in the longitudinal direction is formed by planar contact between the jaws substantially perpendicular to the longitudinal centerline.

18. The crimping device according to claim 17, wherein each of the jaws radially overlap and slide against each other as the jaws move from the partially closed position to the closed position.

19. The crimping device according to claim 17, wherein at least one of the jaws moves in straight line motion as the jaws move from the partially closed position to the closed position.

20. The crimping device according to claim 17, wherein the overlap of the jaws in the longitudinal direction interlocks the jaws to constrain the jaws in all directions except a direction of sliding against each other as the jaws move from the partially closed position to the closed position so that the interlock coordinates movement of the jaws.

21. A method for crimping a first work piece onto a second work piece located internal to said first work piece, said method comprising steps of, in combination:

providing at least two jaws forming a throat surface about the first work piece;

moving the jaws from a partially closed position wherein the first work piece is not crimped onto the second work piece to a closed position wherein the jaws engage and deform the first work piece onto the second work piece to form a fluid-tight seal;

maintaining the throat surface substantially continuous about the first work piece as the jaws move from the partially closed position to the closed position;

overlapping at least two of the jaws in a longitudinal direction of the throat surface and sliding the overlapping jaws against each other as the jaws move from the partially closed position to the closed position; and overlapping the jaws in the longitudinal direction to interlock each of the jaws with adjacent jaws to constrain the jaws against longitudinal movement relative to one another in both longitudinal directions and to coordinate movement of the jaws so that each of the jaws can only move along one sliding path relative to adjacent jaws.

22. The method according to claim 21, further comprising steps of radially overlapping at least two of the jaws and sliding the overlapping jaws against each other as the jaws radially move from the partially closed position to the closed position.

23. The method according to claim 21, further comprising steps of placing the jaws about at least one additional work piece and deforming the first work piece onto the second work piece with the additional work piece located between the first and second work pieces.

24. The method according to claim 21, further comprising steps of providing an inner work piece with a cavity and deforming the outer work piece into the cavity.

25. The method according to claim 21, further comprising steps of separating at least two of the jaws for entry of at least one of the first work piece and the second work piece in a radial direction between the separated jaws.

26. The method according to claim 21, further comprising the step of overlapping the jaws in the longitudinal direction to interlock the jaws and constrain the jaws in all directions except a direction of sliding against each other as the jaws move from the partially closed position to the closed position so that the interlock coordinates movement of the jaws.

27. The method according to claim 21, wherein at least one of the jaws moves with straight-line motion.

28. The method according to claim 21, wherein each of the jaws rotate relative to at least one other of said jaws with said rotation in a plane normal to a central axis of said throat surface.

29. A crimping device for crimping a work piece, said crimping device comprising, in combination:

at least two jaws forming a throat surface about the first work piece and movable between a partially closed position and a closed position wherein the jaws reduce a perimeter of the work piece along a contact path of the through surface;

wherein the throat surface is substantially continuous about the first work piece as the jaws move from the partially closed position to the closed position;

wherein each of said jaws is in continuous sliding area contact with adjacent ones of said jaws on surfaces parallel to a central axis of the throat surface as the jaws move from the partially closed position to the closed position; and wherein each of the jaws rotates relative to at least one other of said jaws with said rotation in a plane normal to the central axis of said throat surface.

30. The crimping device according to claim 29, wherein mating contact surfaces of each mating pair of the jaws have equal radii, and the mating pairs of the jaws have equal radii.

31. The crimping device according to claim 29, wherein mating contact surfaces of each mating pair of the jaws have equal radii, and the mating pairs of the jaws have unequal radii.

32. The crimping device according to claim 29, wherein at least two of the jaws radially overlap and slide against each other on the surfaces parallel to the central axis of the throat surface as the jaws move from the partially closed position to the closed position.

33. The crimping device according to claim 29, the throat surface is circular-shaped when the jaws are in the closed position.

34. The crimping device according to claim 29, wherein at least two of the jaws separate for entry of the work piece in a radial direction between the separated jaws.

35. The crimping device according to claim 29, wherein at least two of the jaws overlap in a longitudinal direction of the throat surface and slide against each other as the jaws move from the partially closed position to the closed position, wherein the overlap of the jaws in the longitudinal direction interlocks each of the jaws with adjacent jaws to constrain the jaws against longitudinal movement relative to one another in both longitudinal directions and coordinates movement of the jaws so that each of the jaws can only move along one sliding path relative to adjacent jaws, and wherein the throat surface has a longitudinal centerline and the overlap of the jaws in the longitudinal direction is formed by planar contact between the jaws substantially perpendicular to the longitudinal centerline.

36. The crimping device according to claim 35, wherein the overlap of the jaws in the longitudinal direction interlocks the jaws to constrain the jaws in all directions except a direction of sliding against each other as the jaws move from the partially closed position to the closed position so that the interlock coordinates movement of the jaws.

37. A circumference reduction device comprising, in combination:

at least two jaws forming a throat surface about a work piece and movable between a partially closed position wherein the work piece is not circumferentially reduced and a closed position wherein the jaws engage and circumferentially reduce the work piece;

wherein the throat surface is a substantially continuous surface about the work piece as the jaws move from the partially closed position to the closed position; and wherein the substantially continuous throat surface provides uniform compression to circumferentially reduce the work piece without non-uniformities as the jaws move from the partially closed position to the closed position.

* * * * *